(12) United States Patent
Jaro (10) Patent No.: US 6,938,053 B2
(45) Date of Patent: Aug. 30, 2005

(54) CATEGORIZATION BASED ON RECORD LINKAGE THEORY

(75) Inventor: Matthew A. Jaro, Lexington, MA (US)

(73) Assignee: Vality Technology Incorporated, Boston, MA (US)

(*) Notice: Subject to any disclaimer, the term of this patent is extended or adjusted under 35 U.S.C. 154(b) by 132 days.

(21) Appl. No.: 09/798,268

(22) Filed: Mar. 2, 2001

(65) Prior Publication Data

US 2002/0156793 A1 Oct. 24, 2002

(51) Int. Cl.$^7$ .............................................. G06F 17/30
(52) U.S. Cl. .................... 707/104.1; 707/100; 707/102; 707/103
(58) Field of Search ........................... 707/104.1, 102, 707/100, 1, 5; 717/104; 715/500; 703/14; 702/19; 382/3–5

(56) References Cited

U.S. PATENT DOCUMENTS

| | | | | |
|---|---|---|---|---|
| 5,371,807 A | * | 12/1994 | Register et al. | 382/159 |
| 5,625,833 A | * | 4/1997 | Levine et al. | 715/500 |
| 5,752,000 A | * | 5/1998 | McGeer et al. | 703/14 |
| 5,752,025 A | * | 5/1998 | Shakib et al. | 707/102 |
| 5,895,470 A | * | 4/1999 | Pirolli et al. | 707/102 |
| 5,943,670 A | * | 8/1999 | Prager | 707/5 |
| 6,003,027 A | * | 12/1999 | Prager | 707/5 |
| 6,016,394 A | * | 1/2000 | Walker | 717/104 |
| 6,023,659 A | * | 2/2000 | Seilhamer et al. | 702/19 |
| 6,195,657 B1 | * | 2/2001 | Rucker et al. | 707/5 |

OTHER PUBLICATIONS

Hersey, "Need: Net–Speed Knowledge Tools," EETIMES.COM [online], [retrieved Jan. 9, 2001], retrieved from the Internet <URL: http://www.eet.com/story/OEG20000901S0033>, (Sep. 1, 2000).

Rao, "Wide Widgets Broaden Web Browsing," EETIMES.COM [online], [retrieved Jan. 9, 2001], retrieved from the Internet <URL: http://www.eet.com/story/OEG20000901S0032>, (Sep. 1, 2000).

* cited by examiner

Primary Examiner—Alford Kindred
Assistant Examiner—Sana Al-Hashemi
(74) Attorney, Agent, or Firm—Ropes & Gray LLP (57) ABSTRACT

The method and apparatus for categorizing an item based on Record Linkage Theory is disclosed. A related method and apparatus for assigning a confidence level to the categorization process is disclosed. In one aspect, the item to be categorized is parsed into at least one token. At least one category that contains the token in the training set is identified. A weight is calculated for each token with respect to a first category. Weights are combined to determine the total weight of the first category. The weighting process is repeated for each relevant category. Where one of a plurality of threshold values is met or exceeded, the item may be automatically assigned to the category with the highest total weight. The combination of threshold values may be selected based on the confidence level associated with that combination of threshold values. Weights for each relevant category, possibly ordered, may be presented.

13 Claims, 6 Drawing Sheets

CATEGORIZATION BASED ON RECORD LINKAGE THEORY

TECHNICAL FIELD

The present invention generally relates to categorization techniques. In particular, the present invention relates to techniques for suggesting or assigning a category for an item to be added to a database based on the principles of Record Linkage Theory, and techniques for determining a confidence level for the categorization process.

BACKGROUND INFORMATION

Categories are a way of grouping objects that are similar according to one or more criteria. For example, text-based objects may be categorized by the language in which they are written or by subject matter. The most popular technique for categorizing documents by subject matter is the ad hoc method, in which someone reviews the document and assigns it to a category. This method is time-consuming and may not be practical for large sets of documents. For example, categorizing web pages as they are added to the World Wide Web may not be possible without a large work force.

Accordingly, automated approaches have been explored. One automated approach is the 'vector-space' method. In this method, a vector of uncommon features, typically words, is generated from objects assigned to a category. A similar vector is generated for an object to be categorized. The likelihood that the object should be assigned to a particular category is determined by calculating the cosine distance between the two vectors.

Another automated approach was developed in the field of information retrieval. Information retrieval typically uses inverse document frequency to weight a word based on the portion of documents in which it occurs. Similarly, an inverse feature frequency may be used to weight a feature based on the portion of documents in which it occurs.

Nonetheless, the techniques described above may not be ideal for categorizing an item within a database. Ad hoc categorization may vary from person to person doing the category selection. The vector-space method may require more analysis and computational power than necessary or appropriate to properly categorize an item. Finally, methods based on information retrieval may be optimized for items that contain a large amount of text and so may be inappropriate for items in which text is scantier.

SUMMARY OF THE INVENTION

In one aspect the invention includes a method for categorizing an item. The method may be used, for example, to suggest or assign a category for an item before it is added to a database. An item is parsed into at least one token. At least one category that contains at least one occurrence of the at least one token is identified from a plurality of categories. A weight based on Record Linkage Theory is calculated for each token from the item that occurs in the first category. When a plurality of weights are calculated, the weights are combined to determine a total weight for the first category. The weight calculation and combination steps are repeated for each category that contains at least one occurrence of a token from the item.

In another aspect, the invention relates to an apparatus for categorizing an item. A parser parses an item from the input device into at least one token. An occurrence identifier identifies at least one category that contains at least one occurrence of the at least one token from a plurality of categories. A calculator calculates a weight based on Record Linkage Theory for each token from the item that occurs in the first category. A weight combiner then combines the weights calculated for the first category to create a total weight for the first category. A looping mechanism initializes the calculator for each category that contains at least one occurrence of the a token from the item.

In embodiments of the method or apparatus for categorizing an item, the weight based on Record Linkage Theory is an agreement weight. The agreement weight is the probability that the at least one token can correctly classify the first category divided by the probability that the at least one token can correctly classify the plurality of categories excluding the first category. In other embodiments, the weight based on Record Linkage Theory also includes a disagreement weight. The disagreement weight is one minus the probability that the at least one token can correctly classify the first category divided by one minus the probability that the at least one token can correctly classify the plurality of categories excluding the first category. In some embodiments, the weight is calculated for token pairs in addition to the tokens themselves.

In embodiments of the method or apparatus for categorizing an item, one or more additional steps are taken after the total weight for each category that contains a token from the item has been calculated. The categories, in other embodiments, are ordered and/or listed by total weight. In some embodiments, the item is automatically assigned to the category with the highest weight when a threshold is met or exceeded. In still other embodiments, the total weights associated with the categories are presented for further analysis.

In another aspect, the invention includes a method for establishing a confidence level with respect to the categorization process. A weight is calculated for at least one category for each item in a training set. A combination of a plurality of threshold values is selected for a plurality of variables. When one or more of the selected threshold values is met or exceeded, the item whose variable exceeds the threshold value is deemed assigned to the highest weight category for the purpose of determining whether the item would have been assigned to the proper category. A confidence level for the combination of threshold values is calculated. In some embodiments, the confidence level is a number of correctly categorized items in the training set less a number of incorrectly categorized items in the training set. The steps of selecting a combination of a plurality of threshold values, deeming items assigned to categories, and calculating a confidence level are repeated for each combination of threshold values. The combination of threshold values that results in the best confidence level is chosen.

In another aspect, the invention relates to an apparatus for establishing a confidence level in the categorizing an item. A memory element contains a plurality of items in a training set. A categorizer calculates a weight for at least one category for each of the plurality of items in the training set. A selector selects a combination of a plurality of threshold values for a plurality of variables. When one or more of the selected threshold values is met or exceeded, a first comparator deems the item whose variable exceeds the threshold value as assigned to the highest weight category for the purpose of determining whether the item would have been assigned to the proper category. A calculator calculates a confidence level for the combination of threshold values. In some embodiments, the confidence level is the number of correctly categorized items in the training set less the number of incorrectly categorized items in the training set. A looping mechanism initializes the first comparator for each combination of threshold values selected by the selector. A second comparator identifies the combination of threshold values that results in the best confidence level.

In embodiments of the method or apparatus for establishing a confidence level in the categorization process, a threshold value for a weight for the highest weight category is one of the plurality of threshold values. In another embodiment, a threshold value for a difference between the highest weight category and the second highest weight category is one of the plurality of threshold values. In another embodiment, a threshold value for a number of tokens and token pairs is one of the plurality of threshold values. In another embodiment, the plurality of threshold values includes a value for more than one of the foregoing variables.

BRIEF DESCRIPTION OF THE DRAWINGS

In the drawings, like reference characters generally refer to the same parts throughout the different figures. Also, emphasis is generally being placed upon illustrating the principles of the invention.

DESCRIPTION

Figure 1:
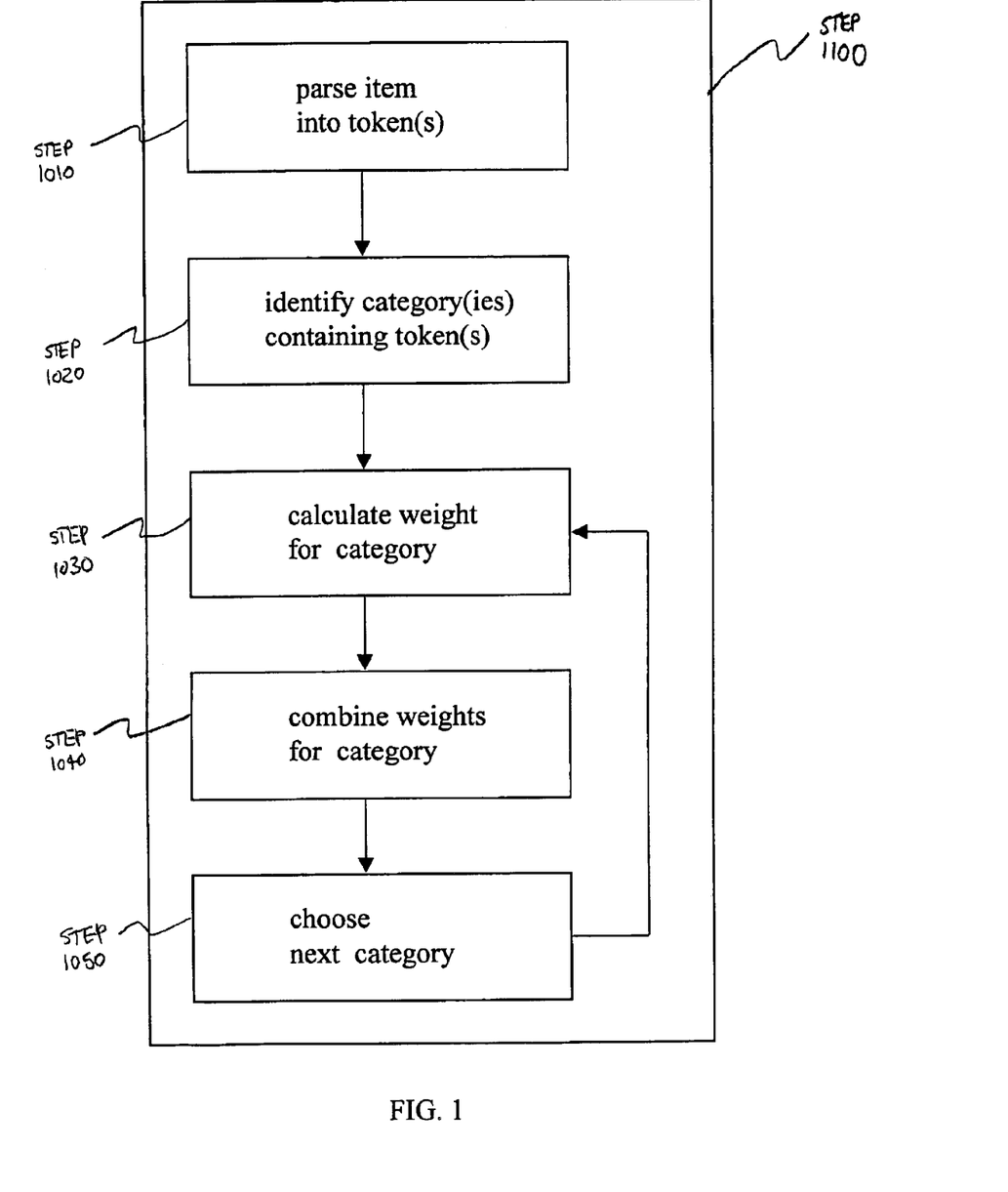
FIG. 1 is a functional block diagram of an embodiment of the method of categorizing an item in accordance with the invention.
Figure 6:
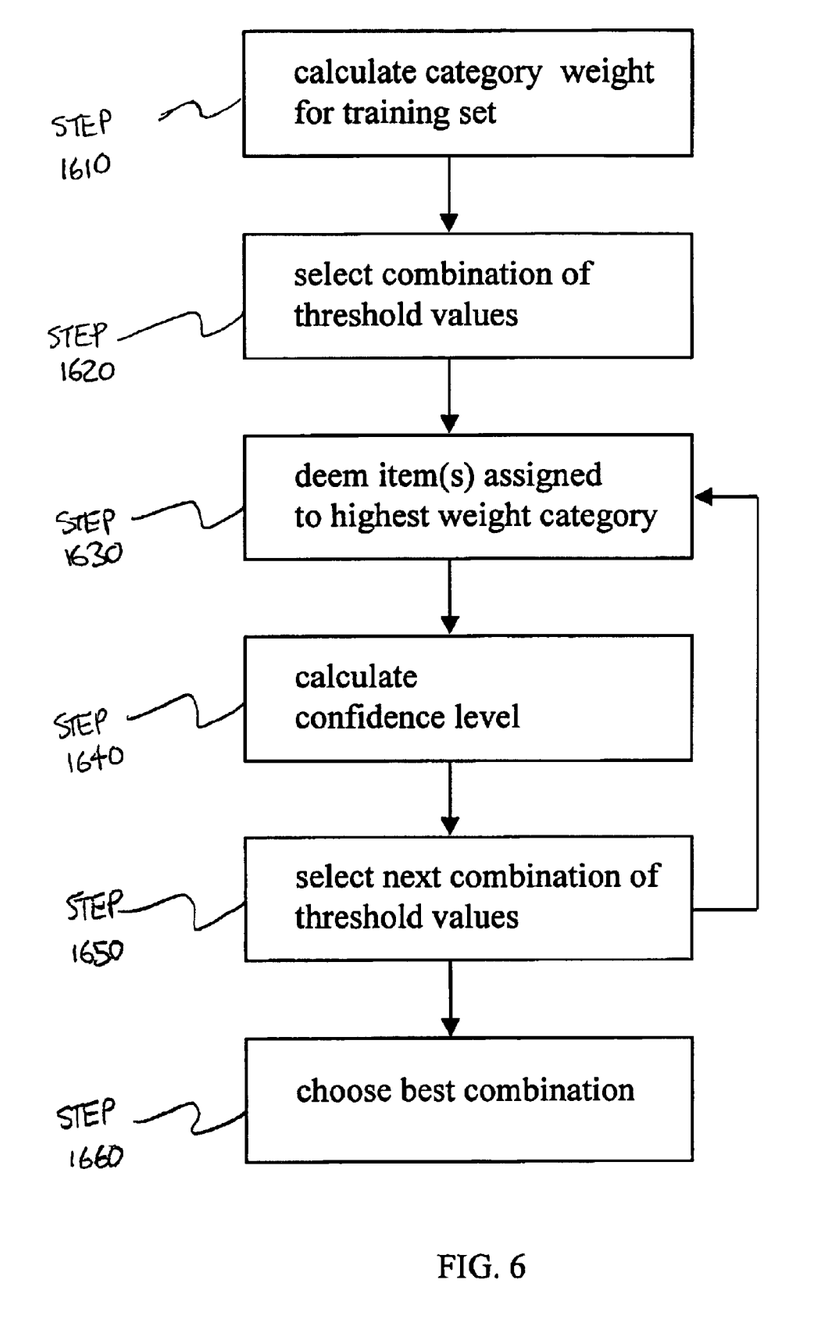
FIG. 6 is a functional block diagram of an embodiment of the method of establishing a confidence level for the categorization process in accordance with the invention.

In brief as illustrated in FIG. 1, the present invention relates in general to the process for suggesting or assigning a category for an item. The present invention also relates to the process of determining a confidence level for the categorization process as illustrated in FIG. 6. The categorization process presumes a training set is available. The training set in some embodiments has been formatted or pre-processed to expedite the categorization process.

Processing Training Set

A training set generally includes a plurality of previously categorized items, each of which contains at least two fields. One of the item's fields contains the designation of its category. There is at least one other field of the item, which contains the description of the item. The description field or fields contains text, which may be in free form. An item may, for example, represent a categorized product. As an example of a categorized product, one item may be "Prepared foods: S&S: Crushed Tomatoes, Italian Style 8 oz." where ":" is the field delimiter and "Prepared foods" is the category designation. Other arrangements are possible and can easily be employed in the categorization process. Nonetheless, for the purposes of this application, the training set is presumed to include a plurality of items, each of which includes at least two fields, one of which contains a category designator. With the presumed arrangement of items within the training set, the present invention operates on free form text residing in fields.

In some embodiments, the items in the training set are pre-processed to facilitate the categorization process. Some such embodiments include the creation of a list of unique tokens in the training set. Some such embodiments include the creation of a token vector from the training set.

In some embodiments in which the training set is pre-processed, processing the training set includes parsing each item into tokens. In some embodiments, only the portion of the item that is not the category designator is parsed into at least one token. The parsing process in some embodiments includes elimination of some portions of the item and standardization of other portions. In some embodiments, the parsing of items in the training set corresponds to the parsing of an item to be categorized.

In some embodiments, a list of unique tokens contained in the training set is created as part of the training set processing. Identifying the unique tokens in the training set allows a list of unique tokens to be created. Such a list may be described as a dictionary of training set tokens. In one embodiment, certain fields, such as the category designation field, are excluded from contributing to the list. Some embodiments exclude tokens from contributing to the list of unique tokens based on their class and/or another attribute. Some such embodiments designate excluded classes or other attributes with respect to a field. Other embodiments designate excluded classes or other attributes with respect to items as a whole. For example, in one embodiment, a developer excludes all numeric tokens with a length of more than 5 characters from the list of unique tokens.

In some embodiments, the items in the training set are sorted by category so that all occurrences of a category are together. In a related embodiment, a token file is created and sorted so that all occurrences of a token are together. In one embodiment, the token file comprises a pair for every occurrence of a token, each pair further comprises the token and the category in which the token occurs. A list of unique tokens is thereby created.

In some embodiments, the list acts as an index to specific tokens in the training set. The index in some embodiments points to a row or column in a token vector table for each unique token. In another embodiment, unique tokens in the training set are identified later in the categorization process. In yet another embodiment, unique tokens in the training set are not identified prior to the categorization process.

In some embodiments, tokens in the training set are analyzed prior to the categorization process to facilitate the categorization process. For example, a frequency of occurrence of tokens in the training set is calculated in some embodiments. Frequency of occurrence is also known as collection frequency or token frequency. Assuming that each token occurrence is independent with respect to the occurrence of other tokens, a lower frequency of occurrence indicates a more selective token. Frequency of occurrence may be calculated for any type of token that can be part of an item. For example, in one embodiment, frequency of occurrence is calculated for each token on the list of unique tokens. In one embodiment, a frequency of occurrence is calculated for each unique index token with respect to the training set as a whole. In one embodiment, a frequency of occurrence is calculated for each unique index token with respect to each category. In another embodiment, a frequency of occurrence is calculated for each unique token with respect to a field in the item. Other levels of specificity for the calculation are also possible. In some embodiments, no frequency of occurrence is calculated for some unique tokens. In one embodiment, such unique tokens include noise words such as <the> and <and>. Creating a list of index tokens prior to calculating their respective frequency of occurrence makes the frequency calculation more efficient.

When the frequency of occurrence is calculated, it is efficient to create and save a table that includes pointers to categories that contain a token in the training set. Such a table avoids the potential need for duplicative searches for categories that contain the token. In one embodiment, the pointers are included in a separate table and associated with a respective token. In an alternative embodiment, a token vector file is created to store token information. The token vector file can be described by a table in which there is a column for each unique token. In an exemplary embodiment, the column contains the following information for a unique token: the number of items that contain occurrences of the token; and the number of occurrences of the token in each category; and the number of occurrences of the token in all categories. In alternative embodiment, there is a row for each unique token.

Tokens are not necessarily independent. For example, phrases containing specific groups of tokens may be included repeatedly in a training set. Although some embodiments approximate reality by presuming that tokens are independent, other embodiments account for the occurrence of phrases. For example, some embodiments include both unique tokens and unique token pairs in the list of tokens that may be used as an index. Related embodiments include both unique tokens and unique token pairs in the token vector. Variations in the analysis of phrases are within the scope of the invention.

In some embodiments, the result of processing a training set may be represented in a table similar to the table below. The description of the categorization process will often refer to an exemplary training set that is described by the table below.

TABLE 1

A Training Set

| category designator | token designator name | 1 Henry | 2 Walter | 3 George | 4 Sam | total $c_i$ |
|---|---|---|---|---|---|---|
| 1 | Carbonyls | 3 | 2 | 0 | 6 | 11 |
| 2 | Peptides | 0 | 1 | 7 | 0 | 8 |
| 3 | Lipids | 2 | 9 | 0 | 3 | 14 |
| 4 | Proteins | 0 | 1 | 0 | 8 | 9 |
| 5 | Vials | 2 | 2 | 2 | 2 | 8 |
| total | $f_j$ | 7 | 15 | 9 | 19 | 50 |

Categorization: Parsing Item

As illustrated in FIG. 1, the first step in the categorization process, STEP 1010, is parsing an item to be categorized into at least one token.

Figure 2:
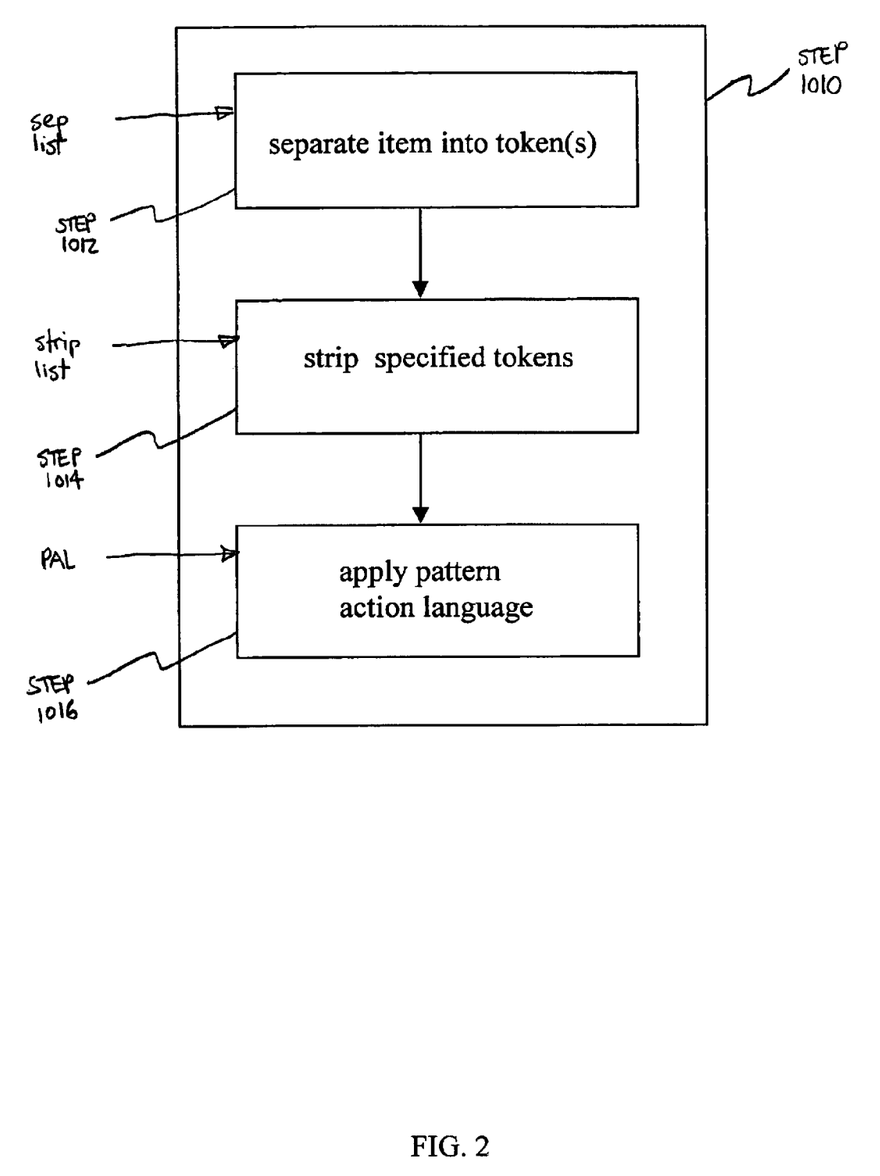
FIG. 2 is a functional block diagram of the substeps for parsing an item to be categorized into at least one token in accordance with one embodiment of the invention.

STEP 1012 of FIG. 2, the first substep with respect to STEP 1010 in some embodiments, is separating the item into tokens. In some embodiments, the developer of the reference data defines a set of individual characters to be used as the basis for separation of the contents of a item into tokens. These characters may be called the SEP LIST. In some such embodiments, these developer-defined characters are used alone. In other such embodiments, these developer-defined characters are used in addition to default characters as the basis for separation. In other embodiments, the developer allows default characters to be used as the sole basis for the separation. A group of characters may be used as a basis for separation. In some embodiments, the separation characters themselves become tokens. In other embodiments, the separation characters are eliminated in the separation process.

STEP 1014 of FIG. 2, a second substep with respect to STEP 1010 in some embodiments, is eliminating some tokens. In some embodiments, the developer defines a set of tokens to be eliminated after the separation of an item to be categorized into tokens. These tokens may be called the STRIP LIST. In one embodiment, the developer defined tokens are the sole tokens that are eliminated. In another embodiment, the developer defined tokens are eliminated in addition to the default tokens. In other embodiments, the developer simply allows default tokens to be eliminated. In some embodiments, each token to be eliminated will consist of a single character. In other embodiments, common tokens that are longer than a single character, such as <the> or <and> may further be stripped from an item.

For example, the item to be categorized may consist of the following "Walter; and Sam." Separating the item into tokens will result in the tokens "<Walter><;><and Sam><.>" where the semicolon and period are defined as the individual separation characters and the "<" and ">" indicates token boundaries. Similarly, a item containing "Walter; and Sam." becomes "<Walter><and><Sam>" where a space, a semicolon, and a period are all defined as the separation characters, separation characters are stripped from the resulting tokens, and the "<" and ">" again indicate token boundaries. The parsed item, "<Walter><and><Sam>", becomes "<Walter><Sam>" where the <and> token is also eliminated.

STEP 1016 of FIG. 2, another substep with respect to STEP 1010 in some embodiments, is applying a pattern action language. In some embodiments, parsing the item includes examining the set of tokens that results from the separation and stripping processes for patterns and acting upon one or more tokens in a recognized pattern. In such embodiments, the attributes of each token are determined once an item has been separated into tokens. In one embodiment, the attributes include class, length, value, abbreviation, and substring. In other embodiments, additional attributes are determined. In other embodiments, different attributes are determined. In yet other embodiments, fewer attributes are determined. In any embodiment, the determination of some attributes of a token may negate the requirement to determine other attributes of the token. In one embodiment which uses the class attribute, classes include Numeric, Alphabetic, Leading Numeric followed by one or more letters, Leading Alphabetic followed by one or more numbers, Complex Mix containing a mixture of numbers and letters that do not fit into either of the two previous classes, and Special containing a special characters that are not generally encountered. In another embodiment which uses the class attribute, other classes are defined. In one embodiment, the Alphabetic classification is case sensitive. In some embodiments, additional developer defined classes are used in conjunction with default classes. In other embodiments, developer defined classes are used to the exclusion of the default classes. For example, in one embodiment, the token <aBcdef> has the attributes of an Alphabetic class token with a length of 6 characters and a value of "aBcdef" where the Alphabetic tokens are case sensitive.

In embodiments in which parsing includes modifying a recognized pattern of tokens in some way, a pattern must be defined for recognition based on the attributes of the tokens. In some such embodiments, a pattern is defined for action only if it occurs in a specific field. In other such embodiments, a pattern is defined for action if it occurs anywhere in the set of item tokens. Pattern matching begins with the first token and proceeds one token at a time. There may be multiple pattern matches to a item. A pattern is defined by any of the attributes of a token, a portion of a token, or a set of tokens. In one embodiment, a pattern is defined by the attributes of a single token. In another embodiment, a pattern is defined by the attributes of a set of tokens. For example, in one embodiment, the pattern is defined as a token with length of less than 10, a substring of "ANTI" in the first through fourth characters of a token, and a substring of "CS" without constraint on where it occurs in the token. In the example embodiment, the tokens <ANTICS> and <ANTI-CSAR> will be recognized for action. In contrast, in the example embodiment, the token <ANTIPATHY> will not be recognized due to failure to meet the second substring constraint and the token <ANTI-POLITICS> will not be recognized due to failure to meet the length constraint.

In embodiments in which parsing includes modifying a recognized pattern of tokens in some way, a number of actions may be taken to modify the pattern. In one embodiment, the action taken in response to a recognized pattern is to change one of the attributes of the pattern. In another embodiment, the action taken in response to a recognized pattern is to concatenate a portion of the pattern. In yet another embodiment, the action taken is response to a recognized pattern is to print debugging information. In other embodiments, other actions are taken. Some embodiments take an action with respect to a substring of a token. Some embodiments take a number of actions in response to a recognized pattern. For example, in one embodiment the command "SET the value of <token> to (1:2)<token>" is defined for execution upon recognition of the pattern of an alphabetic class token of length 7 with a substring "EX" in the first two characters. In the example embodiment, the token <EXAMPLE> is recognized as fitting the pattern and the command is executed resulting in the value of the token changing to the first two characters of the original token or "EX". In other embodiments, the value of noise words, such as "at", "by", and "on", which are not typically helpful to a search, are set to zero so that they are excluded from the list of unique index tokens.

In the exemplary embodiment, there is no application of a pattern action language. For the remaining detailed description, an exemplary item to be categorized which contains the two tokens, "<Walter><Sam>", will be referred to often.

Categorization: Identifying Category

In accordance with STEP 1020 of FIG. 1, the second step in the categorization process is identifying at least one category that contains at least one token from an item to be categorized. The step is taken to increase the efficiency of the categorization process. It is not included in all embodiments. For example, a weight can be calculated for each category even if no token in the item to be categorized exists in the training set. It is unlikely, however, in that scenario that any of the categories in the training set are appropriate for the item to be categorized.

First considering the simple case in which the item to be categorized consists of a single token, in some embodiments the training set is simply searched for the token. The weight calculation step can then be taken with respect to the category that contains the token when it is identified.

In embodiments with a pre-processed training set, identification of a category containing the token is simplified by the processing of the training set. STEP 1022 of FIG. 3, the first substep with respect to STEP 1020 in some embodiments, is locating a token in the index. The location of a token on the list of unique tokens indicates that the token exists in the training set. If the token is not located, the categorization process is terminated in some embodiments because there is no information in the training set that will help categorize the item. STEP 1024 of FIG. 3, the second substep with respect to STEP 1020 in some embodiments, is locating a token in the token vector. The index in some embodiments contains a pointer to the relevant portion of the token vector. In other embodiments, the token may additionally or alternatively be looked up on a table or token vector that indicates the categories in which the token occurs.

Figure 3:
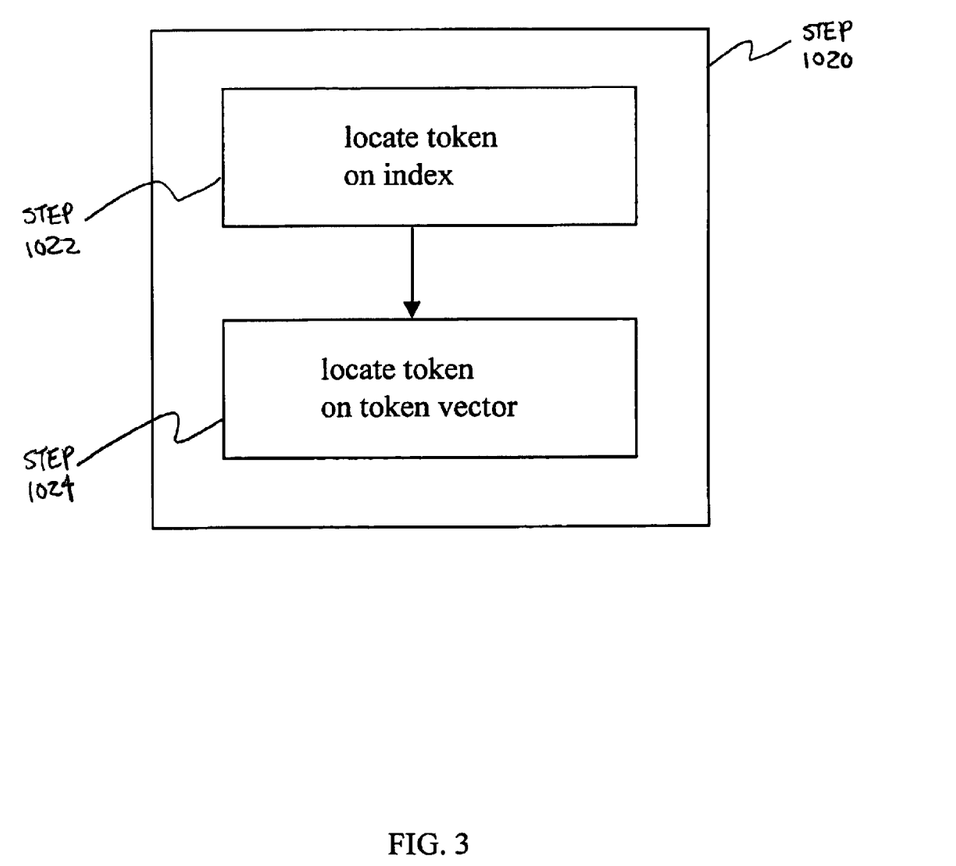
FIG. 3 is a functional block diagram of the substeps for identifying at least one category that contains at least one occurrence of at least one token from the item to be categorized, from a plurality of categories, in accordance with one embodiment of the invention.

Now considering the more general case in which the item to be categorized consists of more than one token, the question of how to order the processing of the tokens arises. In the simplest embodiments, each token is processed in the order in which it occurs in the item to be categorized. In such an embodiment, the first token in the exemplary item to be categorized, which contains the two tokens <Walter> and <Sam>, may be looked up on an index that indicates the categories in which each token occurs. In one embodiment, when the first token occurs in every category in the training set, additional tokens are not looked up on the index to find additional categories for analysis. In such an embodiment, after <Walter> is looked up on the index associated with the exemplary training set shown in Table 1, no search for categories that contain the token <Sam> would be made. An alternative embodiment creates a complete list of categories to be weighted by checking the index for each token in the item to be categorized. In the alternative embodiment, <Sam> would be looked up on the index in addition to <Walter>. In alternative embodiment, an index is used to order the tokens by selectivity prior to the identification of categories.

The result of STEP 1020 should be the set of categories that contain a token from the item to be categorized. STEPS 1030 and 1040 are first taken with respect to the first category on the list.

Categorization: Calculating Weight

The third step in the process of categorizing an item illustrated in FIG. 1 is to calculate (STEP 1030) a weight for each candidate category. After at least one token has been formed from the item and a set of at least one category containing the first token from the item has been identified, the principles of Record Linkage Theory are used to calculate a total weight for each category. Various weight calculations are possible depending on the comparisons between the tokens within the item and tokens within a category which are done.

Record linkage is the process of examining records and locating pairs of records that match in some way. Record Linkage Theory is the probabilistic basis for considering a pair of records to match or be relevant to each other. Each pair of items p is a member of the set of matches M or the set of non-matches U.

Some embodiments of the present invention applies the Theory to match an item to be categorized with individual categories within a training set. The token contents of a category from the training set is a possible candidate for matching with the item to be categorized. In such embodiments, a pair comprises the item to be categorized and a category from the training set that contains at least one token from the item. The training set thereby provides token occurrence information that can be used to categorize additional items.

Some embodiments of the present invention apply the Theory to match an item to be categorized with the set of items within a category within the training set. In such embodiments, each item from the training set is a possible candidate for matching with the item to be categorized. Each item pair includes one item to be categorized, and one previously categorized item from the training set.

Under Record Linkage Theory, the power of a token to identify a category match depends on the selectivity of the token and the accuracy of its categorization. Selectivity and accuracy is defined with respect to each token and category combination.

Selectivity is a measure of the power of the token to discriminate amongst categories. For example, within a database of names, the token <Humperdinck> is likely to be much more selective than the token <Smith> because there are likely to be many more items containing <Smith> than <Humperdinck>. Selectivity $u_i$ is defined as the probability that two items have the same tokens when the pair of items is a member of the set of non-matching pairs U. This is expressed mathematically as follows where $P(\alpha|\beta)$ is the probability of $\alpha$ being true given the condition $\beta$:

$$u_i = P(\text{fields\_agree}|\rho \in U).$$

Under Record Linkage Theory, u-probability, the probability that a token agrees in an unmatched pair, is often approximated by the accidental agreement of tokens in an unmatched pair. As applied in some embodiments, $u_{ij}$ is the probability that an item including $token_j$ should be in a category other than $category_i$. This probability is equal to the number of occurrences of $token_j$ in a category other than $category_i$ divided by the number of occurrences of all tokens minus the number of occurrences of all tokens in $category_i$. The definition of $u_{ij}$, in which $f_j$ is the number of occurrences of $token_j$ in any category, $token_{ij}$ is the number of occurrences of $token_j$ in $category_i$, T is the number of occurrences of all tokens, and $c_i$ is the number of occurrences of all tokens in $category_i$, follows:

$$u_{ij} = \frac{(f_j - token_{ij})}{(T - c_i)} \quad (1)$$

As an example, we now consider the exemplary item to be categorized, which contains the two tokens <Walter> and <Sam>, with respect to the exemplary training set, as shown in Table 1. The probability that an item including $token_4$, <Sam>, should not be in $category_4$, Proteins, is 11/41 because there are eleven occurrences of the token Sam in categories other than the category Proteins ($f_j - token_{ij}$) and there are forty-one occurrences of tokens outside of the category Proteins ($T - c_i$). Similarly, the probability that an item including $token_2$, <Walter>, should be in $category_4$, Proteins, is 14/41 because there are fourteen occurrences of the token Walter in categories other than the category Proteins ($f_j - token_{ij}$) and there are forty-one occurrences of tokens outside of the category Proteins ($T - c_i$).

In practice, $u_{ij}$ may not vary much from token to token for two reasons. First, $f_j$, the number of occurrences of $token_j$ in any category, may be much larger than $token_{ij}$, the number of occurrences of $token_j$ in $category_i$. Accordingly, some embodiments approximate $u_{ij}$ by eliminating $token_{ij}$ from the numerator of the equation and using only $f_j$ as the numerator. Second, the denominator, $(T - c_i)$, is large compared to the numerator, $f_j$ or ($f_j - token_{ij}$). Accordingly, some embodiments approximate $u_{ij}$ by using the u-probability for any token in the training set.

Accuracy $m_i$ is defined as the probability that two items have the same tokens when the pair of items is a member of the set of matching pairs M. This is expressed mathematically as follows where $P(\alpha|\beta)$ is the probability of $\alpha$ being true given the condition $\beta$:

$$m_i = P(\text{fields\_agree}|\rho \in M).$$

Accuracy, also known as m-probability, is a measure of the reliability of the categorization of the token. For example, categorization of an item that is done very carefully or validated after it is done is more likely to be proper than categorization of the same item that is done carelessly and not checked after it is done. With respect to the training set, all items are presumed to be properly categorized.

Under Record Linkage Theory, m-probability is the probability that a token agrees in a matched pair. As applied in some embodiments, $m_{ij}$ is the probability that an item including $token_j$ should be in $category_i$. This probability is equal to the number of occurrences of $token_j$ in $category_i$ divided by the number of occurrences of all tokens in $category_i$. The definition of $m_{ij}$, in which $token_{ij}$ is the number of occurrences of $token_j$ in $category_i$ and $c_i$ is the number of occurrences of all tokens in $category_i$, follows:

$$m_{ij} = \frac{token_{ij}}{c_i} \quad (2)$$

As an example, we again consider the exemplary item to be categorized, which contains the two tokens <Walter> and <Sam>, in conjunction the exemplary training set, as shown in Table 1. The probability that an item including $token_4$, <Sam>, should be in $category_4$, Proteins, is 8/9 because there are eight occurrences of the token Sam in the category Proteins ($token_{ij}$) and there are nine occurrences of any token in the category Proteins ($c_i$). Similarly, the probability that an item including $token_2$, <Walter>, should be in $category_4$, Proteins, is 1/9 because there is one occurrence of the token Walter in the category Proteins ($token_{ij}$) and there are nine occurrences of any token in the category Proteins ($c_i$).

These measures are quantified and applied mathematically to predict the likelihood that an item to be categorized should be assigned to a category based on the training set. We consider the pairs comprising an item to be categorized and a candidate category. Each pair shares at least one token. For each pair, we define the following weights: agreement weight $W_A$ and disagreement weight $W_D$.

Typically, under Record Linkage Theory, agreement weight $W_A$ is the log base 2 of the ratio of the accuracy $m_{ij}$ to the selectivity $u_{ij}$.

$$W_A = \log_2\left(\frac{m_{ij}}{u_{ij}}\right) \quad (3)$$

In some embodiments, the raw agreement weight is used to minimize processing. Raw agreement weight is simply the ratio of the accuracy $m_{ij}$ to the selectivity $u_{ij}$.

Similarly, under Record Linkage Theory, disagreement weight $W_D$ is typically the log base 2 of the ratio of one minus the accuracy $m_{ij}$ to one minus the selectivity $u_{ij}$.

$$W_D = \log_2\left(\frac{(1-m_{ij})}{(1-u_{ij})}\right) \quad (4)$$

In some embodiments that use raw agreement weight, the raw disagreement weight $W_D$ is also used to minimize processing. Raw disagreement weight is simply the ratio of one minus the accuracy $m_{ij}$ to one minus the selectivity $u_{ij}$.

Figure 4:
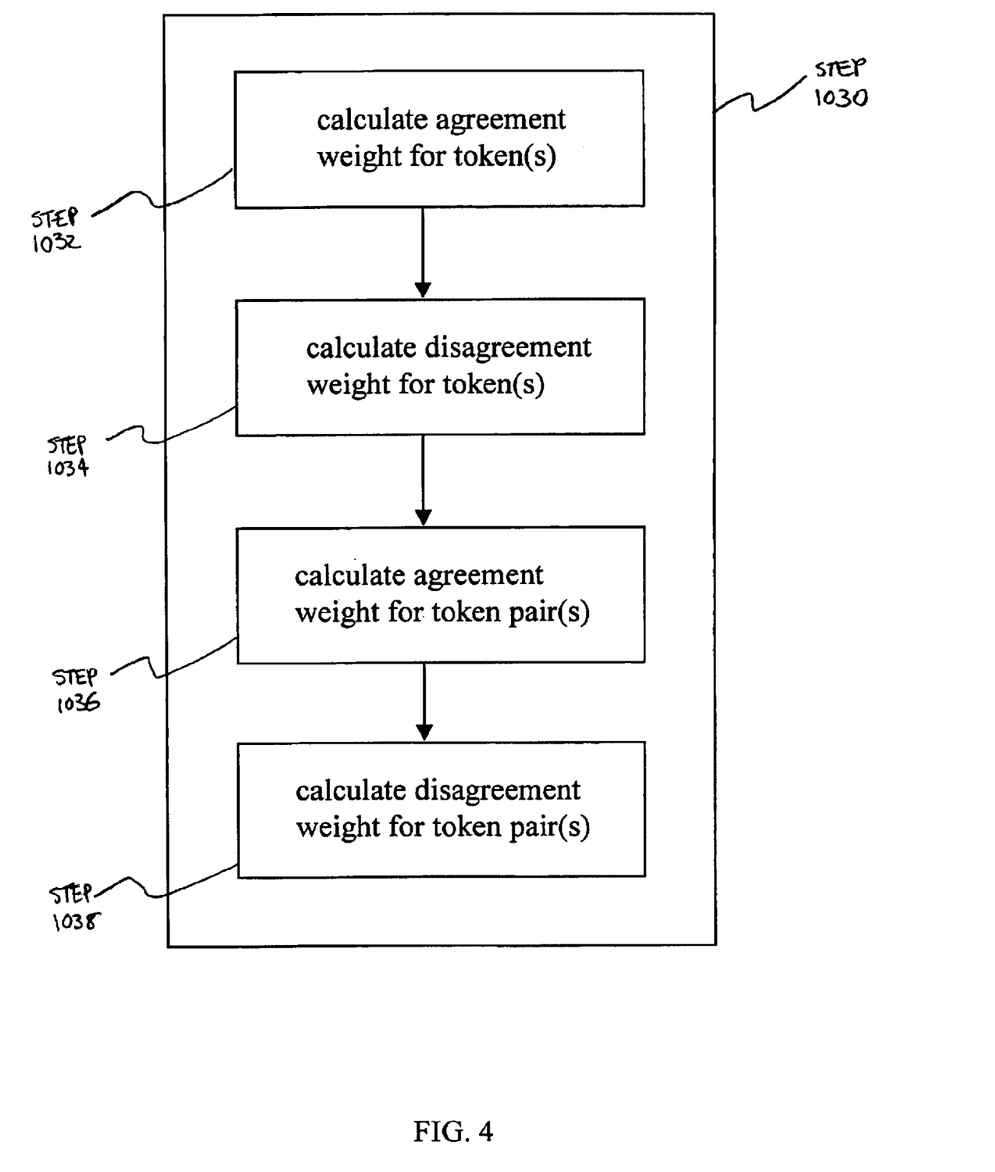
FIG. 4 is a functional block diagram of the substeps for calculating a weight for a single category in accordance with one embodiment of the invention.

STEP 1032 of FIG. 4, the first substep with respect to STEP 1040 in some embodiments, is calculating an agreement weight for each token in the item to be categorized. We now describe STEP 1032 with respect to the exemplary item to be categorized containing the tokens <Walter> and <Sam>, the exemplary training set as shown in Table 1, and an embodiment that uses raw weight and approximates the numerator of $u_{ij}$ as $f_j$. Token$_2$, <Walter>, has an $m_{12}$ probability of 2/11 and a $u_{12}$ probability of 15/39, both with respect to category$_1$, Carbonyls. Accordingly, the token <Walter> contributes an agreement weight of 0.47 with respect to category$_1$. Similarly, token$_4$, <Sam>, has an $m_{14}$ probability of 6/11 and a $u_{14}$ probability of 19/39, both with respect to category$_1$, Carbonyls. Accordingly, the token <Sam> contributes an agreement weight of 1.12 with respect to category$_1$. In some embodiments, these calculations would constitute the entirety of STEP 1030.

Some embodiments calculate only agreement weights. Other embodiments calculate agreement weights and disagreement weights. Some embodiments calculate agreement weights with respect to token pairs or other phrase-based analysis techniques as illustrated in STEP 1036 of FIG. 4. Such embodiments may further calculate disagreement weights with respect to token pairs or other phrase-based analysis techniques as illustrated in STEP 1038 of FIG. 4.

In some embodiments, an agreement weight is calculated if the candidate category contains more than one token equivalent to more than one token in the item to be categorized and the relevant category tokens are arranged in a particular way with respect each other. One phrase-based weight is adjacency weight, which applies when relevant tokens are immediately adjacent to each other. Embodiments typically incorporate either adjacency weights or token pairs.

Another phrase-based weight, used in some embodiments, is semi-adjacency weight. Semi-adjacency weight is calculated if the candidate category contains more than one token equivalent to more than one token from the item to be categorized and the relevant tokens are located near each other. In one embodiment, semi-adjacent weight is calculated if relevant tokens are separated by one intervening token. In other embodiments, semi-adjacent weight is calculated if relevant tokens are separated by more than one intervening tokens. Other phrase-based weight calculations are available.

Categorization: Combining Weights

In accordance with STEP 1040 of FIG. 1, the fourth step in the categorization process is combining the weight calculated in STEP 1030 for the first identified category.

In embodiments that use the log base 2 agreement weight, a plurality of agreement weights calculated with respect to individual tokens in the item to be categorized are summed with respect to a category. In these embodiments, the agreement weight $W_A$ with respect to each token is added to determine the likelihood that the item should be assigned to a candidate category when the candidate category contains a token in the item to be categorized.

In related embodiments that incorporate disagreement weights, a log base 2 disagreement weight is used for consistency. In such cases, disagreement weight $W_D$ is subtracted from the likelihood that the item should be assigned to a candidate category when the candidate category does not contain a token in the item to be categorized.

In embodiments that use raw weight, a plurality of agreement weights with respect to one category are combined by multiplication. Returning to the example used in describing STEP 1032, the agreement weight for category$_1$ is 0.53 with respect to the exemplary item to be categorized containing the tokens <Walter> and <Sam>, the exemplary training set as shown in Table 1, and an embodiment that uses raw weight and approximates the numerator of $u_{ij}$ as $f_j$. The agreement weight for category$_1$ is determined by multiplying the agreement weight of 0.47 contributed by token$_2$, <Walter>, by the agreement weight of 1.12 contributed by token$_4$, <Sam>. In embodiments that use raw weight, a plurality of disagreement weights with respect to one category are combined with each other by multiplication and with the agreement weight by division.

In one embodiment, for example, the likelihood of relevance of a candidate category is calculated by summing the agreement weight $W_A$, the adjacency weight, and the semi-adjacency weight of all of the tokens in the items in the candidate category with respect to the tokens in the item to be categorized. In the example, semi-adjacency weight is only added when there is one intervening token between the item tokens in the candidate category that are equivalent to tokens in the item to be categorized.

Categorization: Iterating

In accordance with STEP 1050 of FIG. 1, the fifth step in the categorization process is to repeat STEPS 1030 and 1040 for the next category on the list of categories that was identified in STEP 1020 until all such categories have been weighted. Accordingly, we now consider the exemplary item to be categorized, which contains the two tokens <Walter> and <Sam>, with respect to the other categories on the list in the exemplary training set, as shown in Table 1, and an embodiment that uses raw weight and approximates the numerator of $u_{ij}$ as $f_j$.

Beginning with the second category in the exemplary training set, as shown in Table 1, an agreement weight, defined as $m_{ij}/u_{ij}$, is calculated for each token that occurs in that category. In this example, token$_2$, <Walter>, has an $m_{22}$ probability of 1/8 and a $u_{22}$ probability of 15/42, both with respect to category$_2$, Peptides. Accordingly, the token <Walter> contributes an agreement weight of 0.35 with respect to category$_2$. In some embodiments, STEP 1036 of FIG. 4, is a substep with respect to STEP 1030.

In the exemplary embodiment, STEP 1030 includes the substep illustrated as STEP 1034 in FIG. 4, the calculation of a disagreement weight. Disagreement weight is typically defined as $(1-m_{ij})/(1-u_{ij})$. Disagreement weight in the exemplary embodiment, however, is defined as $1/(1-u_{ij})$ because token$_{ij}$ is approximated as zero. Disagreement weight is incorporated into STEP 1030 when appropriate with respect to a token in the item. Accordingly, token$_4$, <Sam>, has an $u_{24}$ probability of 19/39 and therefore contributes a raw disagreement weight of 1.95, both with respect to category$_2$, Peptides.

With respect to the second category, STEP 1040 of FIG. 1, requires the combination of agreement weight and disagreement weight calculated in STEP 1030 for the second category. In an embodiment such as the exemplary embodiment in which raw weight is used, agreement weights are divided by disagreement weights with respect to a single category. Accordingly, the raw weight of the item to be categorized, resulting from the combination of the agreement and disagreement weights, with respect to category$_2$ is 0.35/1.95 or 0.18. In other embodiments disagreement weights are calculated using the log base 2 portion of the complete Record Linkage Theory function. In these embodiments, disagreement weight is subtracted from agreement weight with respect to a single category.

We now consider the exemplary item to be categorized, which contains the two tokens <Walter> and <Sam>, with respect to the third category in the exemplary training set, as shown in Table 1, and an embodiment that uses raw weight and approximates the numerator of $u_{ij}$ as $f_j$. Token$_2$, <Walter>, has an $m_{32}$ probability of 9/14 and a $u_{23}$ probability of 15/36, both with respect to category$_3$, Lipids. Accordingly, the token <Walter> contributes an agreement weight of 1.54 with respect to category$_3$. Similarly, token$_4$, <Sam>, has an $m_{34}$ probability of 3/14 and a $u_{43}$ probability of 19/36, both with respect to category$_3$, Lipids. Accordingly, the token <Sam> contributes an agreement weight of 0.41 with respect to category$_3$. Combining the weights results in a raw weight of 0.63 for the exemplary item to be categorized with respect to category$_3$.

Considering the exemplary item and the fourth category in the exemplary training set, token$_2$, <Walter>, has an $M_{42}$ probability of 1/9 and a $u_{42}$ probability of 15/41, both with respect to category$_4$, Proteins. Accordingly, the token <Walter> contributes an agreement weight of 0.30 with respect to category$_4$. Similarly, token$_4$, <Sam>, has an $m_{44}$ probability of 8/9 and a $u_{44}$ probability of 19/41 with respect to category$_4$. Accordingly, the token <Sam> contributes an agreement weight of 1.92, both with respect to category$_4$, Proteins. Combining the weights results in a raw weight of 0.58 for the exemplary item to be categorized with respect to category$_4$.

Considering the exemplary item and the fifth category in the exemplary training set, token$_2$, <Walter>, has an $m_{52}$ probability of 2/8 and a $u_{52}$ probability of 15/42, both with respect to category$_5$, Vials. Accordingly, the token <Walter> contributes an agreement weight of 0.70 with respect to category$_5$. Similarly, token$_4$, <Sam>, has an $m_{54}$ probability of 2/8 and a $u_{54}$ probability of 19/42, both with respect to category$_5$, Vials. Accordingly, the token <Sam> contributes an agreement weight of 0.55 with respect to category$_5$. Combining the weights results in a raw weight of 0.39 for the exemplary item to be categorized with respect to category$_5$.

Categorization: Optional Steps

Figure 5:
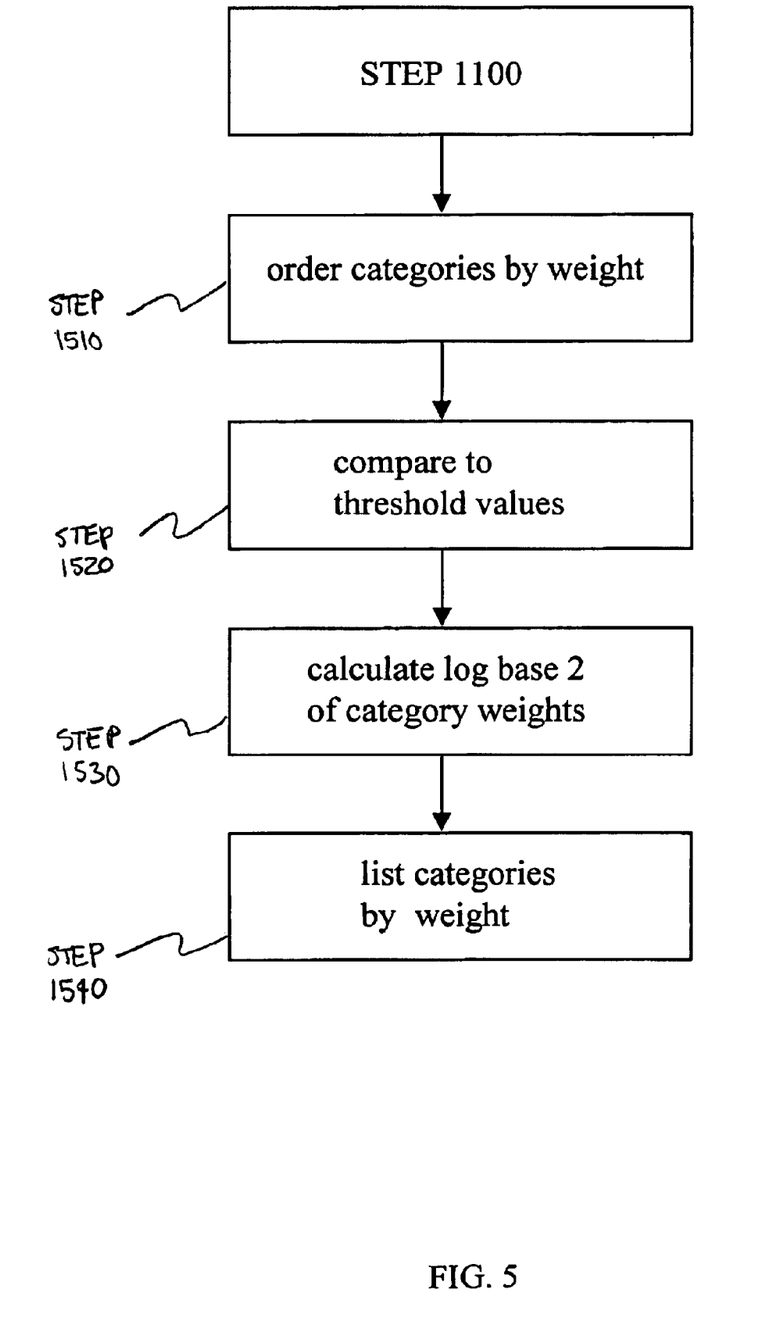
FIG. 5 is a functional block diagram of an embodiment of the method of categorizing an item in accordance with an embodiment of the invention.

FIG. 5 illustrates optional steps that are taken in some embodiments after STEP 1100 of FIG. 1 has been completed. Some embodiments incorporate a subset of the steps described in FIG. 5.

In accordance with STEP 1510 of FIG. 5, one optional step in the categorization process is to order the categories by their respective weight determined in STEP 1040 of FIG. 1. The step may be accomplished by comparing the weights of each category identified in STEP 1020 of FIG. 1. STEP 1510 may make additional processing or analysis of the categories simpler or faster.

In accordance with STEP 1520 of FIG. 5, another optional step in the categorization process is to compare information determined in the categorization process with a threshold value. For example, some embodiments compare the weight of each category identified in STEP 1020 of FIG. 1 to a threshold weight value. In embodiments that incorporate STEP 1510 of FIG. 5, only the weight of the category with the highest weight need be compared to the threshold. Some embodiments compare the difference between the highest weight category and the second highest weight category with a threshold value. Other embodiments compare the number of matching tokens or token pairs to a threshold value. Some embodiments automatically assign the item to be categorized to the highest weight category when one or more of the threshold values is met or exceeded. Such embodiments may further present category weight information to the user for further analysis when no threshold value is met or exceeded.

In accordance with STEP 1530 of FIG. 5, another optional step in the categorization process is to calculate log base 2 agreement weight from raw agreement weight. This step includes the calculation of log base 2 disagreement weight from raw disagreement weight in some related embodiments. Clearly, this step is only appropriate for embodiments that use raw weights prior to this step.

In accordance with STEP 1540 of FIG. 5, another optional step in the categorization process is to list categories and their respective weights. In embodiments that incorporate STEP 1510, the weights may be ordered. In embodiments that incorporate STEP 1520, the listing may only be done for those items to be categorized that are not automatically assigned to a category. Table 2 lists the raw weights for the exemplary item to be categorized, which contains the two tokens <Walter> and <Sam>, with respect to the categories in the exemplary training set, as shown in Table 1, and an embodiment that uses raw weight and approximates the numerator of $u_{ij}$ as $f_j$.

TABLE 2

Weights by Category for Exemplary Item

| Category Name | Weight |
|---|---|
| Lipids | 0.63 |
| Proteins | 0.58 |
| Carbonyls | 0.53 |
| Vials | 0.39 |
| Peptides | 0.18 |

Alternative embodiments list the log base 2 of each of the raw weights for the user.

In an exemplary embodiment, the ordered weights are automatically compared to a plurality of thresholds. Specifically, the weight of the highest weight category is compared to the threshold value of 1.0, and the difference between the highest weight category and the second the highest weight category is compared to a threshold value of 0.2. If one or more threshold values were exceeded, the exemplary embodiment automatically assigns the item to be categorized to the highest weight category. If one or more threshold values were exceeded in the example described by the listing of Table 2, the exemplary item to be categorized, which contains the two tokens <Walter> and <Sam>, would be assigned to category$_3$, Lipids. Since neither threshold value is exceeded, the user is left to determine whether the item to be categorized properly falls within one of the five categories.

Whenever an item is assigned to a category, the training set can be updated to incorporate the new information. Some embodiments update the training set periodically. Other embodiments update the training set whenever an item is assigned to a category. Some embodiments do not regularly update the training set.

Determining Confidence Level

FIG. 6 illustrates the process of determining a confidence level with respect to the categorization process in accordance with one embodiment. The first step in the FIG. 6 process, STEP 1610, is calculating a weight for each category with respect to each item in the training set. STEP 1610 is accomplished in accordance with the process illustrated in FIG. 1 in some embodiments.

The second step in the FIG. 6 process, STEP 1620, is selecting a combination of threshold values. In some embodiments, the total weight of the highest weight category is one of the variables for which a threshold value is selected. In some embodiments, the weight difference between the highest weight category and the second highest weight category is one of the variables for which a threshold value is selected. In some embodiments, the number of matching tokens and/or token pairs is one of the variables for which a threshold value is selected. In one case for an embodiment that contains a threshold value for the three foregoing variable only, the selected combination may be 1.0 for the total weight of the highest weight category, 1.0 the weight difference, and 1.0 for the number of matching tokens.

The third step in the FIG. 6 process, STEP 1630, is deeming an item assigned to its respective highest weight category for purposes of determing whether the item would have been correctly categorized when one or more of the selected threshold values is exceeded. Where 1.0, 1.0, and 1.0 are the threshold values for the total weight of the highest weight category, the weight difference, and the number of matching tokens respectively, an item will be deemed to have been assigned to its respective highest weight category when any of the variable meets or exceeds 1.0.

The fourth step in the FIG. 6 process, STEP 1640, is calculating a confidence level with respect to the categorization process. The confidence level is defined in some embodiments as the number of correctly assigned items minus the number of incorrectly assigned items. A correctly assigned item is an item whose category assignment based on a comparison of threshold values is the same as the training assignment. Similarly, an incorrectly assigned item is an item whose category assignment based on a comparison of threshold values is not the same as the training assignment. In some embodiments, the confidence level is defined as the number of correctly assigned items provided that an absolute or relative threshold number of incorrectly assigned items has not been exceeded. The confidence level depends on the weight calculation scheme that is selected for the categorization process.

The fifth step in the FIG. 6 process, STEP 1650, is selecting the next combination of threshold values. In an embodiment that contains a threshold value for three variables only, the next selected combination may be 1.0 for the total weight of the highest weight category, 1.0 the weight difference, and 2.0 for the number of matching tokens. New combinations are selected until every combination of values within the respective specified ranges have been evaluated. In one embodiment, the specified range for the total weight of the highest weight category is between 1.0 and 60.0 with increments of 1.0. In one embodiment, the specified range for the weight difference is between 1.0 and 30.0 with increments of 1.0. In one embodiment, the specified range for the number of matching tokens is integers between one and seventeen inclusive. STEPS 1630 and 1640 are repeated for each selected combination.

The sixth step in the FIG. 6 process, STEP 1660, is choosing the best combination of threshold values for the training set. In some embodiments, the best combination of threshold values is the combination that results in the highest confidence level. In other embodiments, the best confidence level is one that does not exceed an absolute or relative threshold of incorrectly assigned items. The best combination of threshold values in some embodiments is applied in STEP 1520 of FIG. 5.

In one embodiment, an item in the training set is compared to all combinations of threshold values, and then the comparison is repeated for the next item. In an alternative embodiment, a single combination of threshold values is compared to all items, and then the comparison is repeated for the next combination of threshold values.

Having described embodiments of the invention, it will be apparent to those of ordinary skill in the art that other embodiments incorporating the concepts disclosed herein can be used without departing from the spirit and the scope of the invention. The described embodiments are to be considered in all respects only as illustrative and not restrictive. Therefore, it is intended that the scope of the present invention be only limited by the following claims.

What is claimed is:

1. A method for categorizing an item based on a training set of categorized items, the method comprising the steps of:
   (a) parsing an item into at least one token;
   (b) identifying, from a plurality of categories, at least one category that contains at least one occurrence of at least one token from the item;
   (c) calculating an agreement weight based on Record Linkage Theory for each of the at least one token from the item that occurs in a first category of the at least one category;
   (d) combining the agreement weights to determine a total weight for the first category;
   (e) repeating steps (c) and (d) for each category that contains at least one occurrence of at least one token from the item,
   wherein the agreement weight based on Record Linkage Theory is a probability that the at least one token can correctly classify the first category divided by a probability that the at least one token can correctly classify the plurality of categories excluding the first category.

2. A method for categorizing an item based on a training set of categorized items, the method comprising the steps of:
   (a) parsing an item into at least one token;
   (b) identifying, from a plurality of categories, at least one category that contains at least one occurrence of at least one token from the item;
   (c) calculating an agreement weight based on Record Linkage Theory for each of the at least one token from the item that occurs in a first category of the at least one category;
   (d) calculating a disagreement weight based on Record Linkage Theory for each of the at least one token from the item that does not occur in the first category of the at least one category;
   (e) combining the agreement weights to determine a total weight for the first category;
   (f) repeating steps (c) through (e) for each category that contains at least one occurrence of at least one token from the item and combining the agreement weights and the disagreement weights to determine a total weight for the first category,
   wherein the disagreement weight based on Record Linkage Theory is one minus a probability that the at least one token can correctly classify the first category divided by one minus a probability that the at least one token can correctly classify the plurality of categories excluding the first category.

3. The method of claim 2 further comprising, prior to step (c), reading into memory a token vector that lists a frequency of occurrence of a token in each category that contains at least one occurrence of the token; wherein step (c) comprises calculating an agreement weight based on Record Linkage Theory for each of the at least one token from the item and each token pair from the item that occurs in a first category of the at least one category, wherein the agreement weight based on Record Linkage Theory is a probability that the at least one token can correctly classify the first category divided by a probability that the at least one token can correctly classify the plurality of categories excluding the first category;

further comprising, prior to step (e), calculating a disagreement weight based on Record Iinkage Theory for each of the at least one token from the item and each token pair from the item that does not occur in the first category of the at least one category;

wherein step (f) comprises combining the agreement weights and the disagreement weights to determine a total weight for the first category; further comprising ordering by total weight each category that contains at least one occurrence of at least one token from the item; listing, in descending order by total weight, each category that contains at least one occurrence of at least one token and the log base 2 of its total weight; and if a threshold value is met or exceeded, assigning the item to the category with the highest total weight; or if no threshold value is met or exceeded, presenting an item for further analysis.

4. A method for categorizing an item based on a training act of categorized items, the method comprising the steps of:

parsing an item into at least one token;

(b) identifying, from a plurality of categories, at least one category that contains at least one occurrence of the at least one token;

(c) calculating an agreement weight based on Record Linkage Theory for each of the at least one token from the item that occurs in a first category of the at least one category;

(d) combining the agreement weights to determine a total weight for the first category; and (e) repeating steps (c) and (d) for each category that contains at least one occurrence of at least one token from the item, wherein the agreement weight based on Record Linkage Theory is a probability that the at least one token can correctly classify the first category divided by a probability that the at least one token can correctly classify the plurality of categories excluding the first category.

5. A method for categorizing an item based on a training set of categorized items, the method comprising the steps of:

(a) parsing an item into at least one token;

(b) identifying, from a plurality of categories, at least one category that contains at least one occurrence of the at least one token;

(c) calculating an agreement weight based on Record Linkage Theory for each of the at least one token from the item and each token pair from the item that occurs in a first category of the at least one category;

(d) calculating a disagreement weight based on Record Linkage Theory for each of the at least one token from the item and each token pair from the item that does not occur in the first category of the at least one category;

(e) combining the agreement weights to determine a total weight for the first category, and combining the agreement weights and the disagreement weights to determine a total weight for the first category;

(f) repeating step (c) through (e) for each category that contains at least one occurrence of at least one token from the item;

wherein the agreement weight based on Record Linkage Theory is a probability that the at least one token can correctly classify the first category divided by a probability that the at least one token can correctly classify the plurality of categories excluding the first category;

wherein the disagreement weight based on Record Linkage Theory is one minus a probability that the at least one token can correctly classify the first category divided by one minus a probability that the at least one token can correctly classify the plurality of categories excluding the first category, wherein step (f) further comprises a step for combining the agreement weights and the disagreement weights to determine a total weight for the first category; further comprising ordering by total weight each category that contains at least one occurrence of at least one token from the item; listing, in descending order by total weight, each category that contains at least one occurrence of at least one token and the log base 2 of its total weight; and if a threshold value is met or exceeded, assigning the item to the category with the highest total weight; or if no threshold value is met or exceeded, presenting an item for further analysis.

6. A method for categorizing an item based on a training set of categorized items, the method comprising the steps of:

(a) parsing an item into at least one token;

(b) identifying, from a plurality of categories, at least one category that contains at least one occurrence of the at least one token;

(c) calculating an agreement weight based on Record Linkage Theory for each of the at least one token from the item that occurs in a first category of the at least one category;

(d) calculating a disagreement weight based on Record Linkage Theory for each of the at least one token from the item and each token pair from the item that does not occur in the first category of the at least one category;

(e) combining the agreement weights to determine a total weight for the first category;

(f) repeating steps (c) through (e) for each category that contains at least one occurrence of at least one token from the item, wherein the disagreement weight based on Record Linkage Theory is one minus a probability that the at least one token can correctly classify the first category divided by one minus a probability that the at least one token can correctly classify the plurality of categories excluding the first category.

7. An apparatus for categorizing an item based on a training set of categorized items, the apparatus comprising:

an input device; a parser in signal communication with the input device, said parser parsing an item from the input device into at least one token;

an occurrence identifier in signal communication with the parser, the occurrence identifier identifying, from a plurality of categories, at least one category that contains at least one occurrence of the at least one token;

a calculator in signal communication with the occurrence identifier, the calculator calculating an agreement weight based on Record Linkage Theory for each of the at least one token from the item that occurs in a first category of the at least one category;

a summer in signal communication with the calculator, the summer summing the agreement weights to determine a total weight for the first category; and a looping mechanism in signal communication with the occurrence identifier and the summer, the looping mechanism initializing the calculator for each category that contains at least one occurrence of at least one token from the item.

wherein the agreement weight is a probability that the at least one token can correctly classify the first category divided by a probability that the at least one token can correctly classify the plurality of categories excluding the first category.

8. An apparatus for categorizing an item based on a training set of categorized items, the apparatus comprising:

an input device; a parser in signal communication with the input device, said parser parsing an item from the input device into at least one token;

an occurrence identifier in signal communication with the parser, the occurrence identifier identifying, from a plurality of categories, at least one category that contains at least one occurrence of the at least one token;

a calculator in signal communication with the occurrence identifier, the calculator calculating an agreement weight based on Record Linkage Theory for each of the at least one token from the item that occurs in a first category of the at least one category, the calculator further calculating a disagreement weight based on Record Linkage Theory for each of the at least one token from the item that does not occur in the first category of the at least one category;

a summer in signal communication with the calculator, the summer summing the agreement weights and the disagreement weights to determine a total weight for the first category; and a looping mechanism in signal communication with the occurrence identifier and the summer, the looping mechanism initializing the calculator for each category that contains at least one occurrence of at least one token from the item, wherein the disagreement weight is one minus a probability that the at least one token can correctly classify the first category divided by one minus a probability that the at least one token can correctly classify the plurality of categories excluding the first category.

9. An apparatus for categorizing an item based on a training set of categorized items, the apparatus comprising:

an input device;

a parser in signal communication with the input device, said parser parsing an item from the input device into at least one token;

a means for identifying at least one category that contains at least one occurrence of the at least one token, from a plurality of categories, the means for identifying at least one category in signal communication with the parser;

a means for calculating a weight based on Record Linkage Theory for each of the at least one token from the item that occurs in a first category of the at least one category, the means for calculating a weight in signal communication with the occurrence identifier;

a means for combining weights to determine a total weight for the first category, the means for combining weights in signal communication with the calculator; and a looping mechanism in signal communication with the means for identifying at least one category and the means for calculating a weight, the looping mechanism initializing the means for calculating a weight for each category that contains at least one occurrence of at least one token from the item, wherein the means for calculating a weight calculates an agreement weight that is a probability that the at least one token can correctly classify the first category divided by a probability that the at least one token can correctly classify the plurality of categories excluding the first category.

10. The apparatus of claim 9 wherein the means for calculating a weight calculates the agreement weight for each of the at least one token from the item and each token pair from the item that occurs in a first category of the at least one category.

11. The apparatus of claim 9 wherein the means for calculating a weight also calculates a disagreement weight based on Record Linkage Theory for each of the at least one token from the item that does not occur in the first category of the at least one category; and wherein the a means for combining weights combines the agreement weights and the disagreement weights to determine a total weight for the first category.

12. The apparatus of claim 11 wherein the disagreement weight is one minus a probability that the at least one token can correctly classify the first category divided by one minus a probability that the at least one token can correctly classify the plurality of categories excluding the first category.

13. The apparatus of claim 12 wherein the means for calculating a weight also calculates the agreement weight for each of the at least one token from the item and each token pair from the item that occurs in a first category of the at least one category; and the disagreement weight for each of the at least one token from the item and each token pair from the item that does not occur in the first category of the at least one category.

* * * * *